United States Patent [19]
Hamagishi et al.

[11] Patent Number: 5,751,479
[45] Date of Patent: May 12, 1998

[54] THREE-DIMENSIONAL DISPLAY

[75] Inventors: Goro Hamagishi, Toyonaka; Ken Mashitani, Hirakata; Eiji Nakayama, Osaka; Susumu Tanase, Hirakata, all of Japan

[73] Assignee: Sanyo Electric Co., Ltd., Osaka-fu, Japan

[21] Appl. No.: 559,539

[22] Filed: Nov. 16, 1995

[30]  Foreign Application Priority Data

| Nov. 18, 1994 | [JP] | Japan | 6-285730 |
| Apr. 28, 1995 | [JP] | Japan | 7-105420 |
| May 19, 1995 | [JP] | Japan | 7-121409 |

[51] Int. Cl.⁶ .................................. G02B 27/22
[52] U.S. Cl. ........................... 359/464; 359/475
[58] Field of Search ........................ 359/464, 465, 359/462, 475; 348/60

[56]     References Cited

U.S. PATENT DOCUMENTS

| 4,717,949 | 1/1988 | Eichenlaub | 358/3 |
| 4,829,365 | 5/1989 | Eichenlaub | 358/3 |
| 5,036,385 | 7/1991 | Eichenlaub | 358/3 |
| 5,040,878 | 8/1991 | Eichenlaub | 350/345 |
| 5,410,345 | 4/1995 | Eichenlaub | 348/59 |

*Primary Examiner*—Paul M. Dzerzynski
*Assistant Examiner*—Mark A. Robinson
*Attorney, Agent, or Firm*—Nikaido, Marmelstein, Murray & Oram LLP

[57]     ABSTRACT

A 3-D display including a light source which emit lights in a flat plate shape, a liquid crystal panel for color images which displays left eye images and right eye images respectively with left eye pixels and right eye pixels, and color filters each being formed for pixels of a number of the observing positions of 3-D images, which convert emitted lights from the light source into very small luminescences of red, green and blue being aligned in a predetermined order. The traveling direction of the emitted lights from the light source and given to a observer is decided depending on each color.

21 Claims, 13 Drawing Sheets

THREE-DIMENSIONAL DISPLAY

BACKGROUND OF THE INVENTION

1. Field of the Invention

The present invention relates to a three-dimensional display, especially one in which proper observing distance can be shortened even if pixel pitches are small, and uniformalization of the brightness and reduction of the crosstalk can be attempted while observer's eyes move in a lateral direction.

2. Description of the Prior Art

As a method of displaying three-dimensional (hereinafter it will be referred simply as 3-D) images in a 3-D display without using special glasses, here is one example that a light source is separated in a stripe shape, whereby a light is separated in lights which enter observer's left eye and those which enter observer's right eye. In this method, as shown in FIG. 1, an emitted light in a flat plate shape from a backlight 2 is separated in a stripe shape through an optical filter 40 having aperture portions 40a and light screening portions 40b to form left eye images IL and right eye images IR one line after the other line on a liquid crystal panel 1.

Additionally, a proper observing distance D, that is a distance from a image forming surface of the liquid crystal panel 1 to a observing point where 3-D images can be observed, is in proportion to an optical path length $L_1$ between the image forming surface of the liquid crystal panel 1 and an optical filter 40, and to a value subtracting 1 from a ratio of a distance between observer's eyes E to a pixel pitch (dot pitch) P, as shown in following expression (1).

$$D = L_1 \times [(E/P) - 1] \quad (1)$$

if no space is provided between the liquid crystal panel 1 and the optical filter 40, whereby a surface of the optical filter 40 and the liquid crystal panel 1 are closely contacted, the optical path length $L_1$ can be shown in following expression (2) because a glass and a polarizing plate on the light incidence side of the liquid crystal panel 1 exist between the optical filter 40 and the image forming surface of the liquid crystal panel 1, letting $T_1$ be thickness of the glass, $n_1$ be a refractive index of the glass, $T_2$ be thickness of the polarizing plate, and $n_2$ be a refractive index of the polarizing plate.

$$L_1 = T_1/n_1 + T_2/n_2 \quad (2)$$

If pixel pitches P are made small to obtain an image of higher accuracy, it is obvious from above expression (1) that the proper observing distance D is enlarged. Since the glass in the present liquid crystal panel 1, for example, has a thickness $T_1$ of 1.1mm and a refractive index $n_1$ of 1.53, and the polarizing plate therein has a thickness $T_2$ of 0.2mm and a refractive index $n_2$ of 1.49, when a highly accurate liquid crystal panel 1 having pixel pitch P of 70µm is used letting a distance between observer's eyes E be 65mm, the proper observing distance becomes 780mm, whereby little practicality can be achieved.

Furthermore, another problem is that the crosstalk where both left eye images and right eye images simultaneously come into sight often arises while observer's eyes move in a lateral direction. Especially when an aperture area of each pixel is enlarged and the black matrix between pixels are made thinner to obtain higher brightness, the crosstalk arises more frequently.

If the black matrix are made thicker to prevent the crosstalk from arising, on the other hand, the brightness becomes changeable while observer's eyes move in a lateral direction.

SUMMARY OF THE INVENTION

In view of above described circumstances, a first object of the present invention is to supply a 3-D display in which a proper observing distance can be shortened even if pixel pitches are small.

A second object of the present invention is to supply a 3-D display in which uniformalization of the brightness and reduction of the crosstalk can be obtained while observer's eyes move in a lateral direction.

A third object of the present invention is to supply a 3-D display which is suitable for fixing observer's eyes in the proper observing position for a long time.

Furthermore, a fourth object of the present invention is to supply a 3-D display in which color 3-D images can be displayed without using a liquid crystal panel for color images.

A first 3-D display according to the present invention is a 3-D display which comprises a light source which emits lights in a flat shape and a liquid crystal panel for color images where left eye images and right eye images are formed, characterized by providing a color separation means which convert the emitted light to a set of very small luminescences of respective colors aligned in a predetermined order, in the light source.

A color filter comprising color filters of the three primary colors aligned in a predetermined order one by each pixel is provided within the liquid crystal panel for color images.

Since the color filters of respective colors in the liquid crystal panel for color images let only lights of the same color pass by and absorb lights of other colors, very small luminescence having the different colors from that of the filters in the liquid crystal panels for color images are screened by the color separation means, and traveling direction of emitted lights from the light source are restricted depending on each color.

Images of the same color are formed for every three pixels in a liquid crystal panel for color images in which pixels of the three primary colors are aligned in order. If consideration is given to each color, a proper observing distance D can be calculated through above expression (1), with pitches between pixels having the same color (hereinafter it will be referred simply as the same color pixel pitches) instead of pixel pitches P.

Since the same color pixel pitches are three times larger than the pixel pitches P in this case, the proper observing distance D is shortened so as to be nearly one-third of conventional one.

Furthermore, width of the very small luminescence of each color is larger than that of conventional example in which emitted light from a backlight is separated with an optical filter in a stripe shape and no black stripe region is arranged therebetween, whereby uniformity of the brightness while observer's head is moved in a lateral direction can be improved.

Additionally, the crosstalk does not exist even though the head is moved in a lateral direction, because pixels to be displayed being separated in the right and the left are not closely contacted.

A second 3-D display according to the present invention is a 3-D display which comprises a light source which emits lights in a flat shape and a liquid crystal panel for black-and-white images where left eye images and right eye images are formed, characterized by further comprising one light source for pixels of a corresponding number to that of observing points of a 3-D image and a color separation means which converts emitted light from the light source to a set of very small luminescences of red, blue and green aligned in a predetermined order, arranging color filters on the light emission side of the liquid crystal panel parted from the panel corresponding to each colors of the color separation means, restricting traveling direction of each color with color of emitted light from the light source and the color filters, and separating images on the liquid panel in right and left color signals.

If the color filter is arranged on the light emission side of the liquid crystal panel for black-and-white images, very small luminescence of which have different colors from that of color filters, out of those being color separated through the color separation means, are screened, because each color filter let only lights of the same color pass through and absorb lights of different colors, whereby traveling direction of each emitted light from the light source is restricted depending on the color. Therefore, traveling direction of each color (red, green and blue) is restricted depending on emission from the light source and positional relationship between color filters arranged on the light emission side of the liquid crystal panel for black-and-white images, whereby each color passing through longitudinal lines of the liquid crystal panel for black-and-white images can be separated, and color 3-D images can be displayed with the liquid crystal panel for black-and-white images.

When color images are displayed with the liquid crystal panel for black-and-white images, images having the same color are formed for every three pixels, because pixels corresponding to the three primary colors are displayed being aligned in order. Therefore, if consideration is given to each color, a proper observing distance D can be calculated through above expression (1), with the same color pixel pitches instead of pixel pitches P.

Since the same color pixel pitches are three times larger than pixel pitches P in this case, the proper observing distance D is shortened so as to be nearly one-third of conventional one.

Furthermore, width of the very small luminescence of each color is larger than that of conventional example in which emitted light from a backlight is separated with an optical filter in a stripe shape and no black stripe region is arranged therebetween, whereby uniformity of the brightness while observer's head is moved in a lateral direction can be improved.

Additionally, the crosstalk does not arise even if the head is moved in a lateral direction, because pixels to be displayed being separated in the right and the left are not closely contacted.

A third three dimensional display according to the present invention is a 3-D display which comprises a transmission type display panel which displays left eye images and right eye images with left eye pixels and right eye pixels and an image separation means which separates the image rightward and leftward into left eye images and the right eye images, characterized by further comprising a color separation and emission means which separates and emits lights of a plurality of different colors to the light incidence side of the display, and modulating the light of respective colors with image signals of different colors for each pixel when the lights pass through the display panel.

According to the present invention, when observer is out of the proper observing position, colors of the lights traveling toward observer's eyes come not to correspond to those of image signals which modulate lights in the display panel.

To put it concretely, when observer is out of the proper observing position, an observer comes to recognize images of different colors, because color of lights which travels toward observer's eyes, out of those pass through certain pixel, changes.

Furthermore, it becomes possible to display color images with low-costed display panel for black-and-white images.

Additionally, ordinary color images can be displayed by emitting lights of the three primary colors, red, green and blue, by color separation and emission means.

The image separation means can be constructed using a parallax barrier panel, a barrier panel on the light incidence side, or both of the parallax barrier panel and the barrier panel on the light incidence side.

Especially when the image separation means is constructed using the barrier panel on the light incidence side, barrier panel on observer's side comes not to obstruct the view, because it is out of sight. Moreover, the brightness of 3-D images can be improved by constructing a surface on the light incidence side of light screening portion of the barrier panel on the light incidence side with reflecting materials.

When both of a parallax barrier panel and a barrier panel on the light incidence side are used, the brightness of 3-D images can be improved, a crosstalk region where right and left images are mixed, observing from the observing point, can be made small, and maximum brightness can cover larger range.

Still according to a three dimensional display of present invention, an optical path length L1 is enlarged without shortening the proper observing distance D, and a polymer dispersed liquid crystal panel is arranged between the light source and the liquid crystal panel for color or black-and-white images to be turned on and off, whereby conditions can be changed over between one in which emitted lights from the light source, separated the color, pass by the polymer dispersed liquid crystal panel and another in which each separated color is mixed to be a white light and be emitted toward the liquid crystal panel. When the polymer dispersed liquid crystal panel is changed over to display 2D images, images of all pixels can be recognized with both right and left eyes by mixing each color in the polymer dispersed liquid crystal panel and emit the light as a white light, whereby the resolution while 2D images are displayed can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
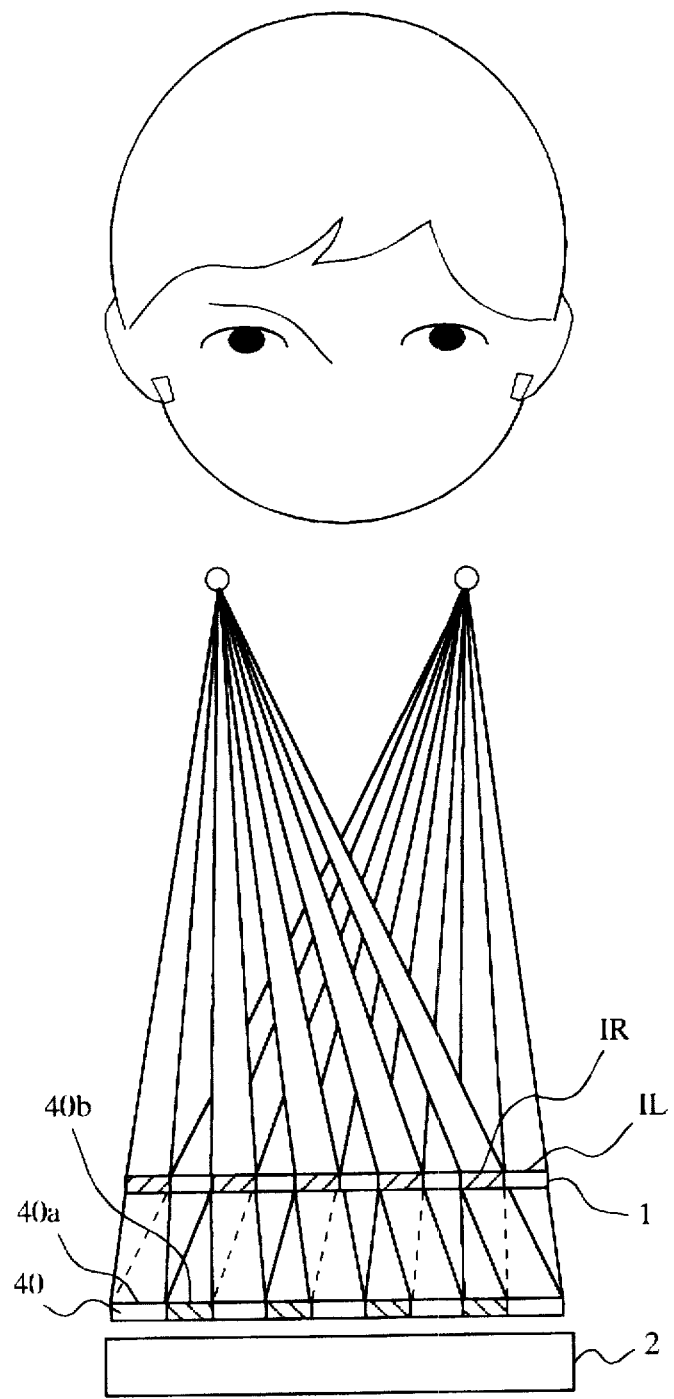
FIG. 1 is a schematic view showing the principle of a conventional 3-D display.
Figure 2:
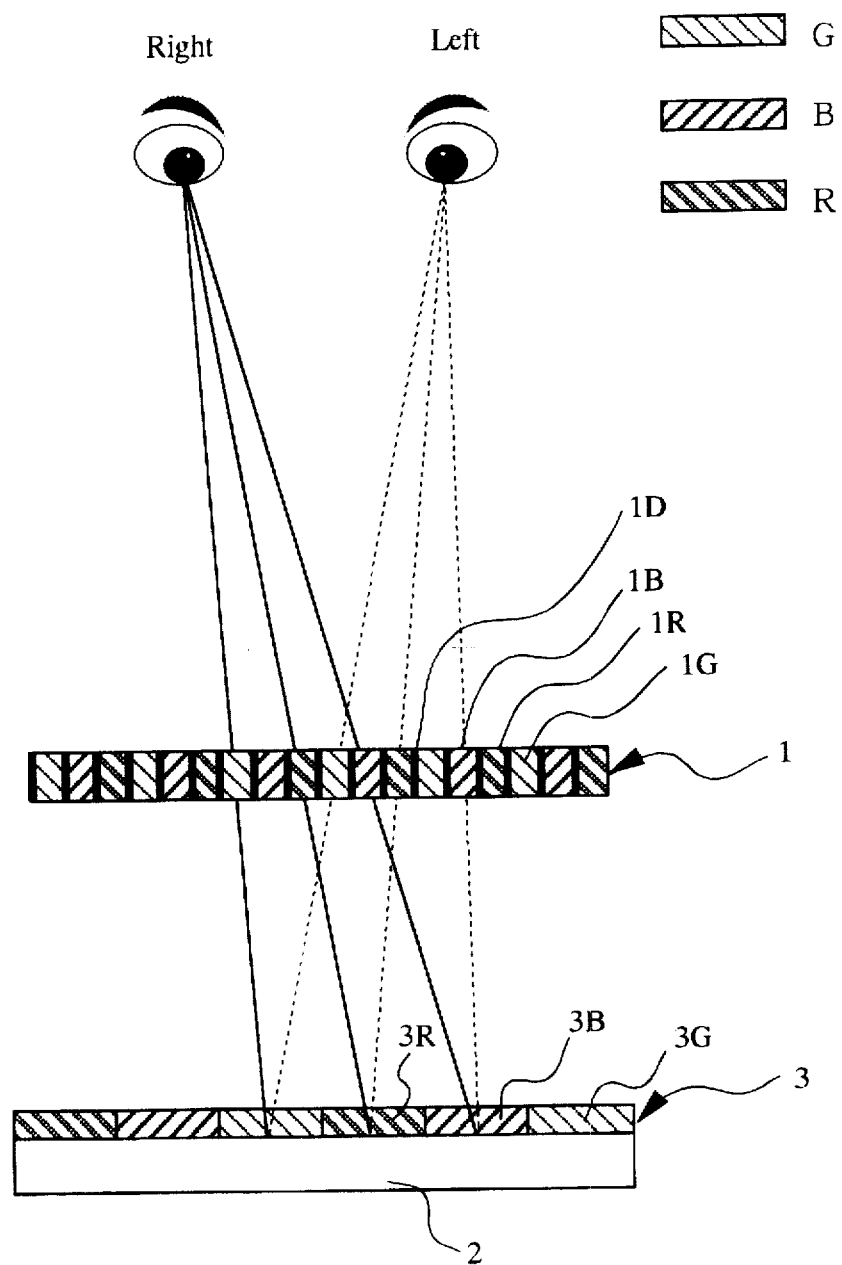
FIG. 2 is a schematic view showing the construction of 3-D display according to the first embodiment of the present invention.

Description is now made of a first embodiment of a 3-D display according to the present invention on the basis of FIG. 2.

As shown in FIG. 2, this 3-D display is so constructed that an observer sees the lights which are emitted from a backlight 2 arranged on the back side of a liquid crystal panel for color images 1 and pass it through, from the front side of the liquid crystal panel for color images 1.

The liquid crystal panel for color images 1 comprises red pixels 1R, green pixels 1G and blue pixels 1B each being formed in a stripe shape and the black matrix 1D between two of pixels 1R, 1G and 1B.

The backlight 2 emits white lights in a flat shape, on a surface facing to the liquid crystal panel for color images 1 of the backlight 2, a color filter 3 comprising filters of the three primary colors, that is, red filters 3R, green filters 3G and blue filters 3B aligned in the opposite order to that of red pixels 1R, green pixels 1G and blue pixels 1B in the liquid crystal panel for color images 1 is formed by spreading, for example, a dye stuff or a pigment in a stripe shape.

However, it is not indispensable to form the color filter 3 on the surface of the backlight 2. The color filter 3 may be arranged in any position between the backlight 2 and the liquid crystal panel for color images 1.

Each of the color filters 3R, 3G and 3B is corresponded to pixels 1R, 1G and 1B of a corresponding number to that of observing points. Therefore, in this embodiment in which two observing points exist, each of color filters 3R, 3G and 3B is arranged to be corresponded to two pixels.

There is no need to provide light screening portions such as the black matrix, therefore, width of respective color filters 3R, 3G and 3B in a lateral direction is a little larger than twice as that of each pixel 1R, 1G and 1B.

Out of all lights emitted from the backlight 2, only lights having the same color with that of respective color filters 3R, 3G and 3B in the color filter 3 can pass through each filter of the color and lights having other colors are absorbed. Accordingly, the lights from the backlight 2 are emitted from the color filter 3 as very small luminescences in a stripe shape in which respective colors, blue, red and green, are aligned in the opposite order to that of pixels 1R, 1G and 1B in the liquid crystal panel for color images 1.

The pixels for respective colors 1R, 1G and 1B are provided in the liquid crystal panel for color images 1. For example, pixel for red color 1R let the emitted light from the color filter 3 of the same color, that is red light, pass through and absorb blue and green lights. Therefore, for the observer, the very small luminescences of blue and green are screened, that is, traveling directions of the very small luminescences from the color filter 3 are restricted depending on each color.

Therefore, forming right eye images and left eye images one line after the other line for every pixel for red color 1R in the liquid crystal panel for color images, the observer can see 3-D images of red color.

Since 3-D images of other colors, blue and green, can be observed through the same method, the observer can see 3-D color images which is composition of the three primary colors, blue, red and green.

The proper observing distance D is determined through the expression (1) with pixel pitches of respective colors, that is, the same color pixel pitches. Therefore, the proper observing distance is determined by substituting 3P, three pixel pitches, for the pixel pitch P in the expression (1), and the proper observing distance D is shortened to be nearly one-third of conventional one.

Furthermore, no light screening portion is provided between each of color filters 3R, 3G and 3B in the color filter 3, whereby a width of the very small luminescence of respective colors becomes larger than that of conventional example in which emitted lights from a backlight 2 is separated with an optical filter in a stripe shape, and uniformity of the brightness while observer's head is moved in a lateral direction can be improved, since no black matrix is arranged therebetween.

Additionally, the crosstalk is not arisen even if the head is moved in a lateral direction, because each color is separated in the right and the left, and pixels separated in the right and the left are not closely contacted.

In this embodiment, it is possible to form 2-D images using the liquid crystal panel for color images 1.

Moreover, anything which emits lights in a flat shape can be used as the backlight 2, for example, a cold cathode type flat fluorescent lamp and a cathode luminescence flat lamp.

Figure 3:
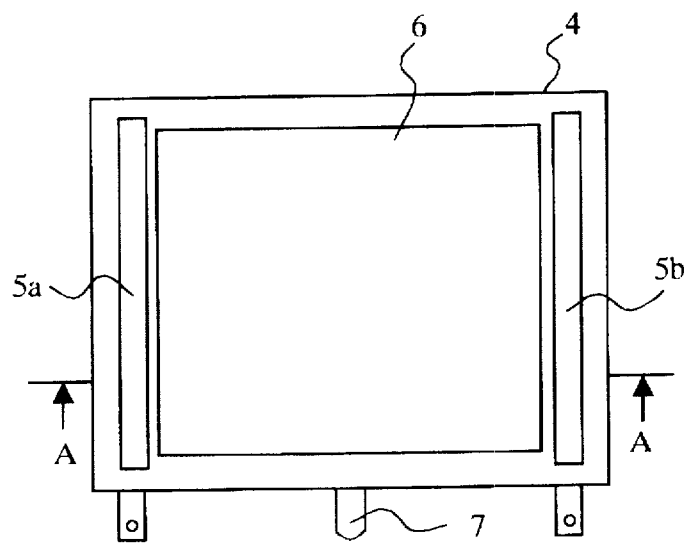
FIG. 3 is a front view showing a general cold cathode type flat fluorescent lamp.
Figure 4:
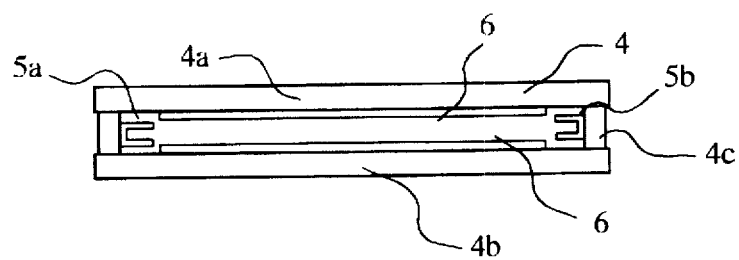
FIG. 4 is a cross-section al view taken along a line A–A'shown in FIG. 3.

As shown in FIGS. 3 and 4, in the cold cathode type flat fluorescent lamp, a pair of, right and left, discharge electrodes 5a and 5b are arranged in a glass case 4 comprising a front glass panel 4a, a back glass panel 4b, and surrounding glass frame 4c. A fluorescent surface 6 which emits white light is formed on a back surface of the front glass panel 4a and a front surface of the back glass panel 4b between both discharge electrodes 5a and 5b. And a tip tube 7 is arranged between the both discharge electrodes 5a and 5b.

Also a cathode luminescence flat fluorescent lamp can be used as the backlight 2.

Figure 5:
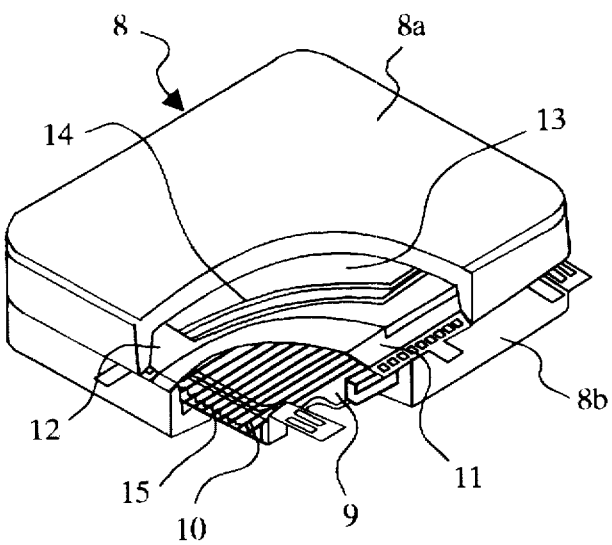
FIG. 5 is a perspective view showing a general cathode luminescence flat fluorescent lamp.

As shown in FIG. 5, for example, the cathode luminescence flat fluorescent lamp has a construction in which a back electrode 9, a line cathode 10, a first grid electrode 11 and a second grid electrode 12 are contained in this order, from the back side, in a glass case 8 comprising a front glass 8a having shape of a box whose back surface is opened and a back glass 8b having shape of a box whose front surface is opened, and fluorescent film 13 which emits white lights and aluminum thin film 14 as an acceleration electrode are laminated in this order, from the front side, on a back surface of front section of the front glass 8a.

The line cathode 10 is supported by a support 15 being in a position which parts by a predetermined distance from the back electrode 9.

Furthermore, the color filter 3 comprising a dye stuff or a pigment is used as a color separation means in this embodiment, though, another color filter comprising multi-layer interference filters can be used instead of the color filter 3.

If the color filter comprising a dichronic filter is used, unnecessary lights are reflected toward the backlight 2 and reused after diffused reflection at the back electrode 2. Accordingly, efficiency of the light utilization can be improved.

Figure 6:
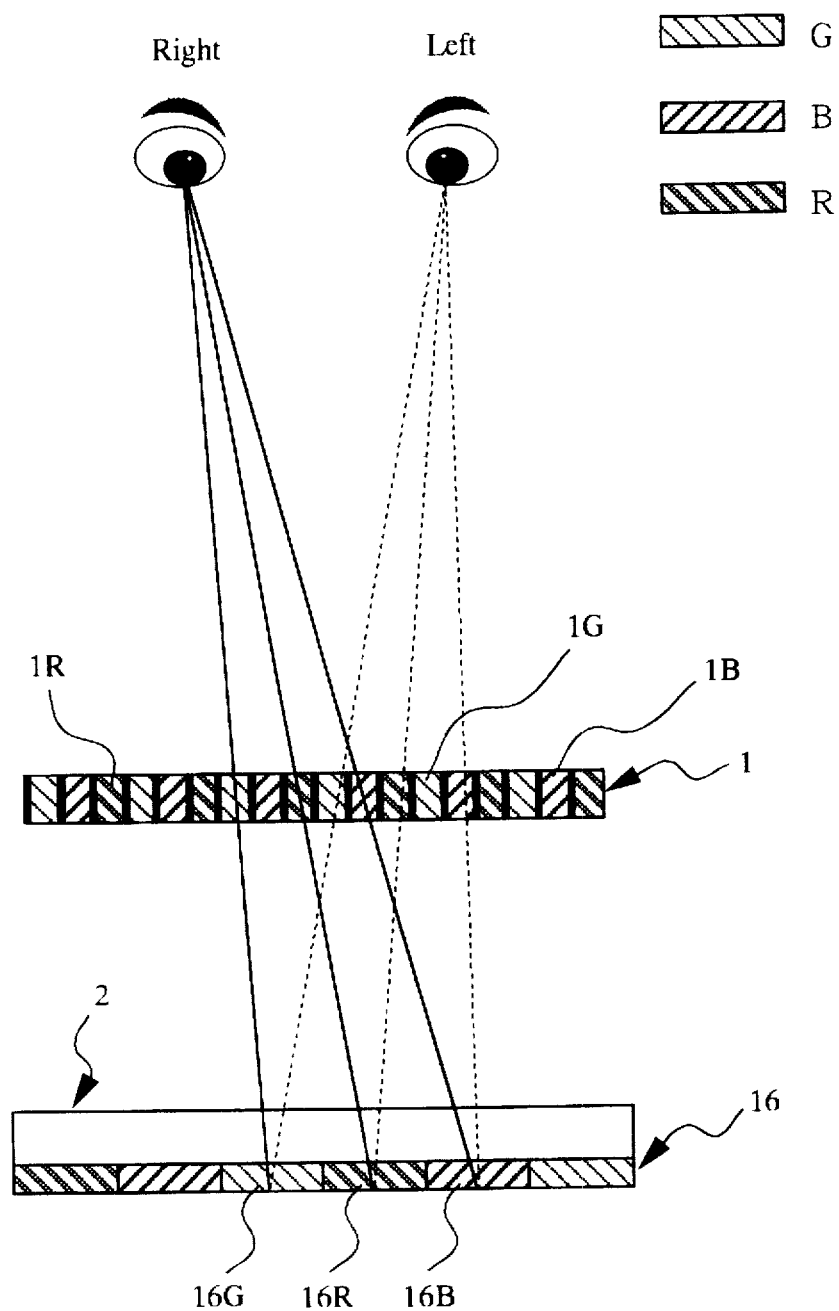
FIG. 6 is a schematic view showing the construction of 3-D display according to the second embodiment of the present invention.

In a second embodiment of the present invention, a cold cathode type flat fluorescent lamp is used as the backlight 2. As shown in FIG. 6, the cold cathode type flat fluorescent lamp is provided with a color fluorescent surface 16 comprising red fluorescent surfaces 16R which emit red lights, green fluorescent surfaces 16G which emit green lights, and blue fluorescent surfaces 16B which emit blue lights. Each of 16R, 16G and 16B has a width which is a little larger than twice as that of each of pixels 1R, 1G and 1B in the liquid crystal panel for color images 1. The fluorescent surfaces 16R, 16G and 16B are aligned in the opposite order to that of color filters provided within the liquid crystal panel for color images 1.

In this embodiment, the color fluorescent surface 16 itself has a function of a color separation means which converts lights to a set of very small luminescences of red, blue and green aligned in a predetermined order. Since the principle and effects of that color 3-D images can be displayed using the color fluorescent surface 16 of the backlight 2 and the liquid crystal panel for color images 1 are the same with that of an above embodiment, detailed description is omitted to avoid overlapping.

In this embodiment, also a cathode luminescence flat fluorescent lamp which is provided with a color fluorescent film comprising blue fluorescent surfaces which emit blue lights, red fluorescent surfaces which emit red lights, and green fluorescent surfaces which emit green lights can be used as the backlight 2, instead of the cold cathode type flat fluorescent lamp. Each of the fluorescent surfaces has a width which is a little larger than twice as that of each of pixels 1R, 1G and 1B in the liquid crystal panel for color images 1, and aligned in the opposite order to that of respective color filters in the liquid crystal panel for color images 1.

Figure 7:
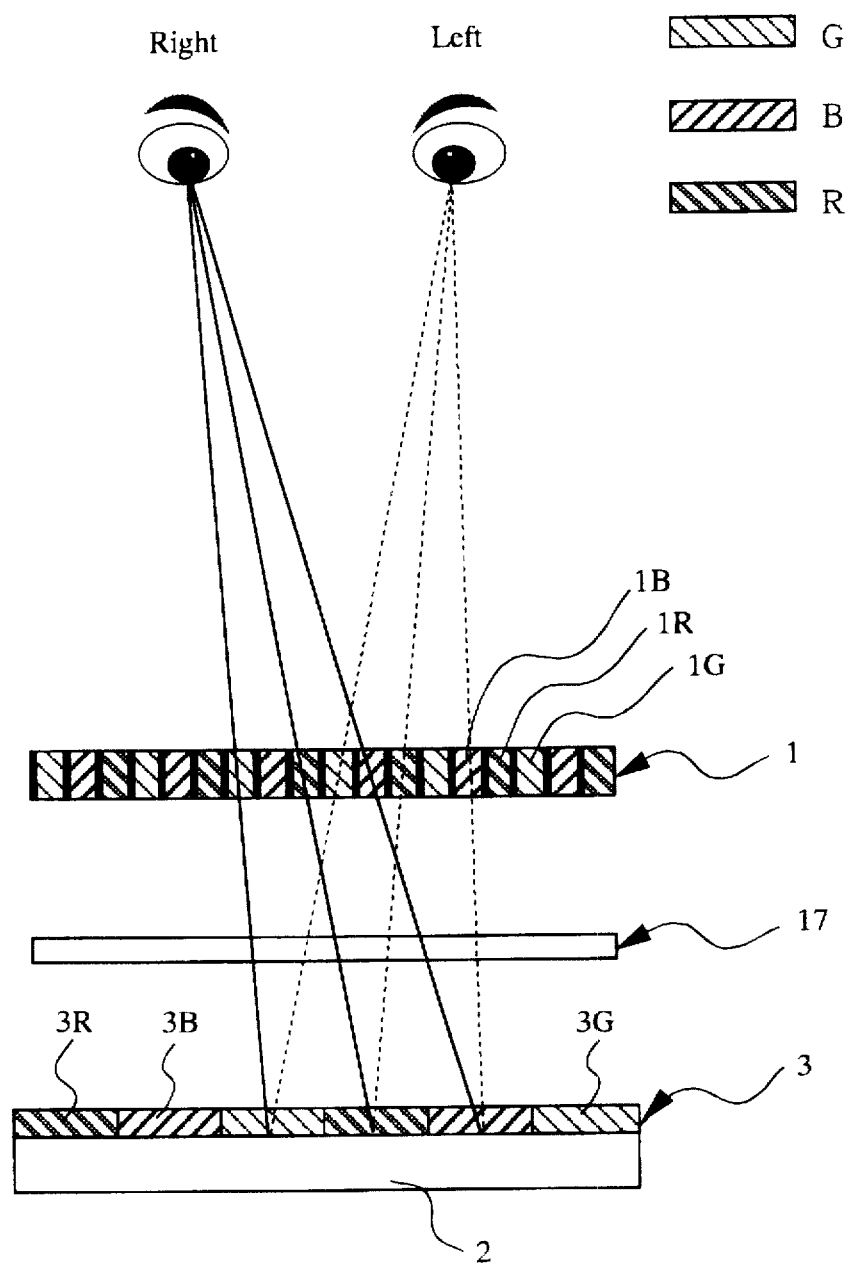
FIG. 7 is a schematic view showing the construction of 3-D display according to the third embodiment of the present invention.
Figure 8:
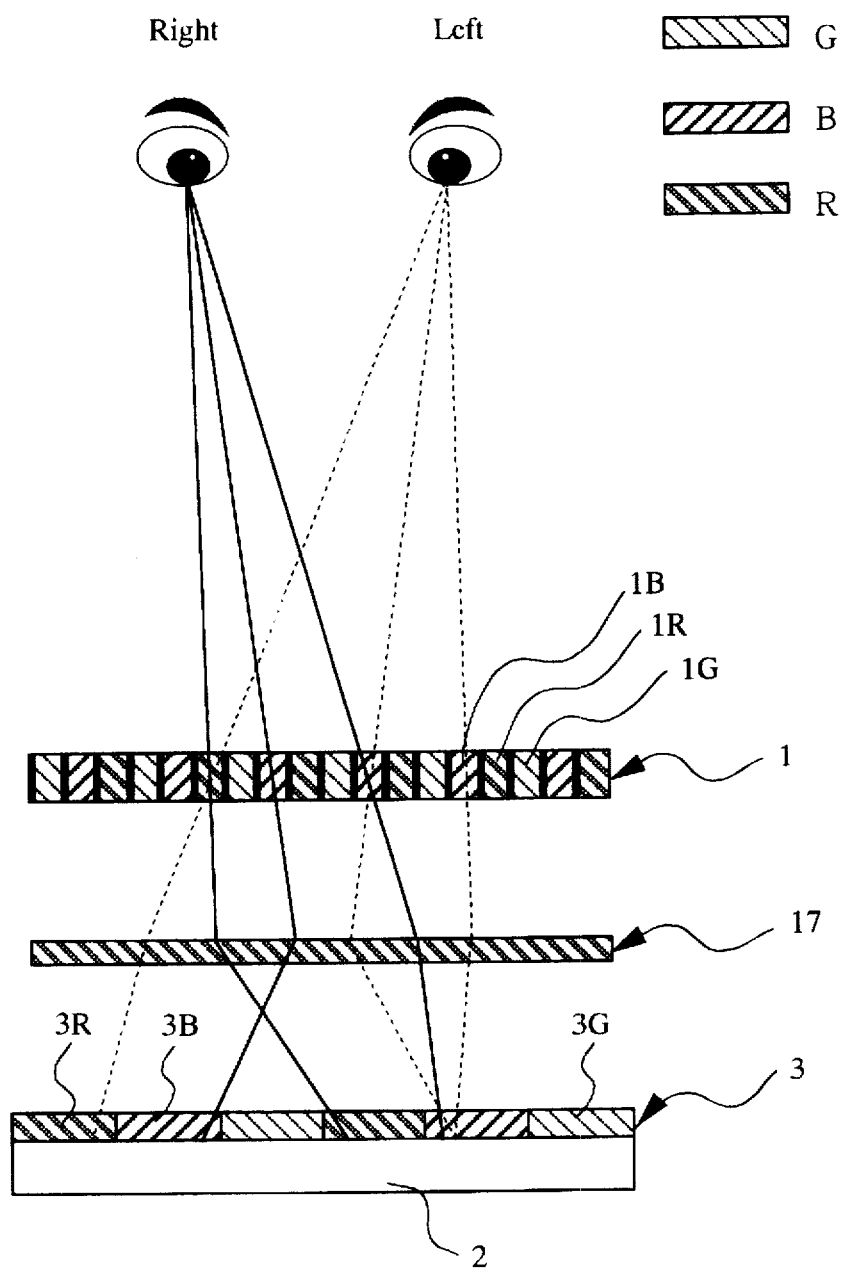
FIG. 8 is a schematic view showing the construction of 3-D display according to the third embodiment of the present invention.

According to a third embodiment of the present invention illustrated in FIGS. 7 and 8, a polymer dispersed liquid crystal panel 17 is arranged between the liquid crystal panel for color images 1 and the color filter 3 formed on the front surface of the backlight 2.

When a power source is turned on, the polymer dispersed liquid crystal panel 17 becomes translucent, as shown in FIG. 7, and 3-D images can de displayed according to the same principle with that of an above embodiment. On the other hand, when the power source is turned off, the polymer dispersed liquid crystal panel 17 has the same function with that of an expansion sheet, as shown in FIG. 8, and lights of respective colors separated by the color filter 3 are composed to be white lights.

If 2-D images are formed with the liquid crystal panel for color images 1 while the white lights are emitted, resolution and quality of images can be improved comparing to above described embodiments in which each of right and left eyes can see only pixels 1R, 1G and 1B in lines forming right eye images or left eye images respectively, because both eyes can see pixels 1R, 1G and 1B in all lines in the liquid crystal panel for color images 1.

Figure 9:
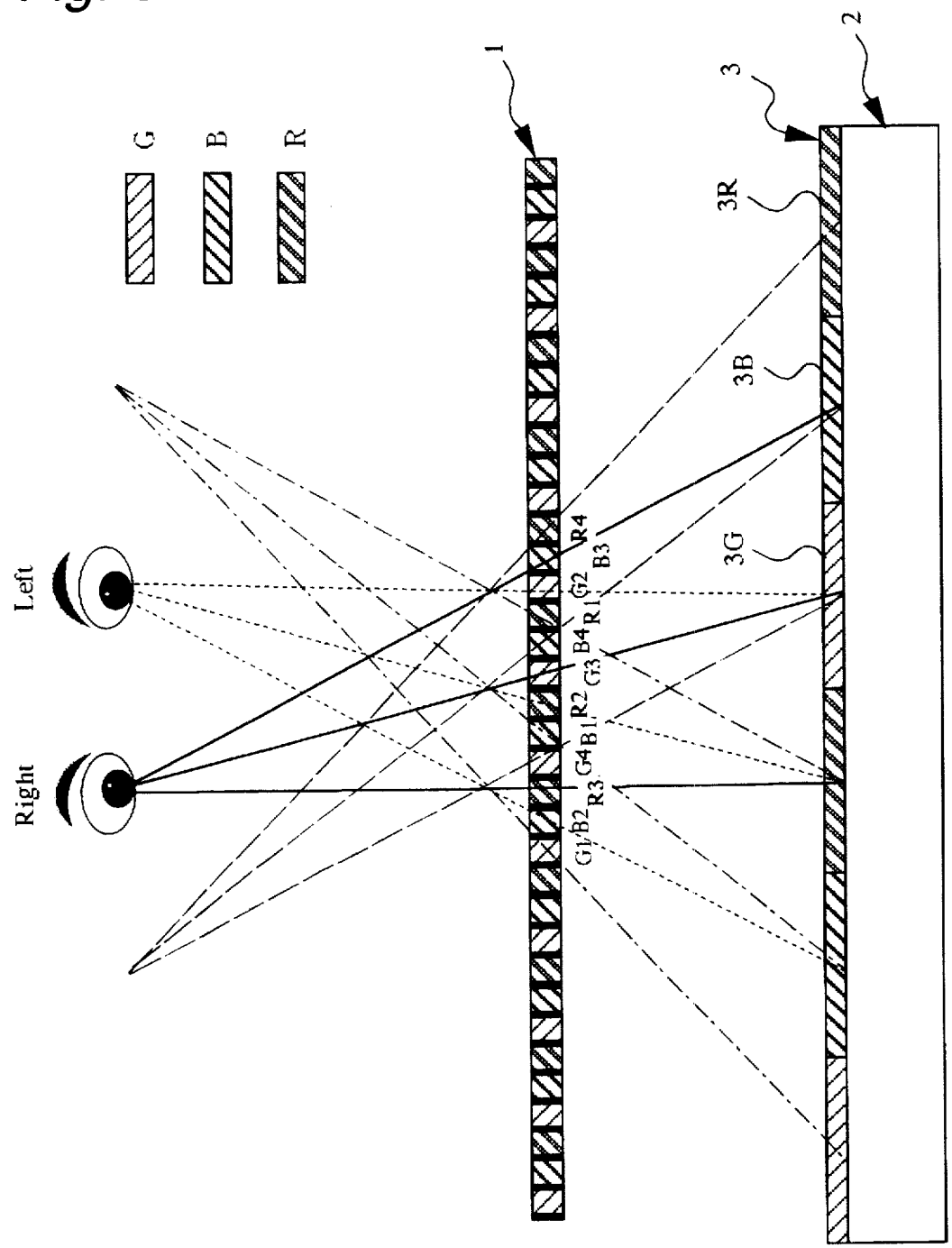
FIG. 9 is a schematic view showing the construction of 3-D display according to the fourth embodiment of the present invention.

According to the fourth embodiment of the present invention which is shown in FIG. 9, the color filter 3 comprises color filters 3R, 3G and 3B aligned in the same order with that of color filters in the liquid crystal panel for color images 1. Each of the color filters 3R, 3G and 3B has a width which is a little larger than the sum of four times as a width of respective pixels 1R, 1G and 1B, and a width of four black matrix 1D.

In this embodiment, four images having different observing points are formed in every four lines in the liquid crystal panel for color images 1, and four-observing points type 3-D images can be displayed by forming red images, blue images and green images respectively on red pixels R1–R4, blue pixels B1–B4 and green pixels G1–G4.

Figure 10:
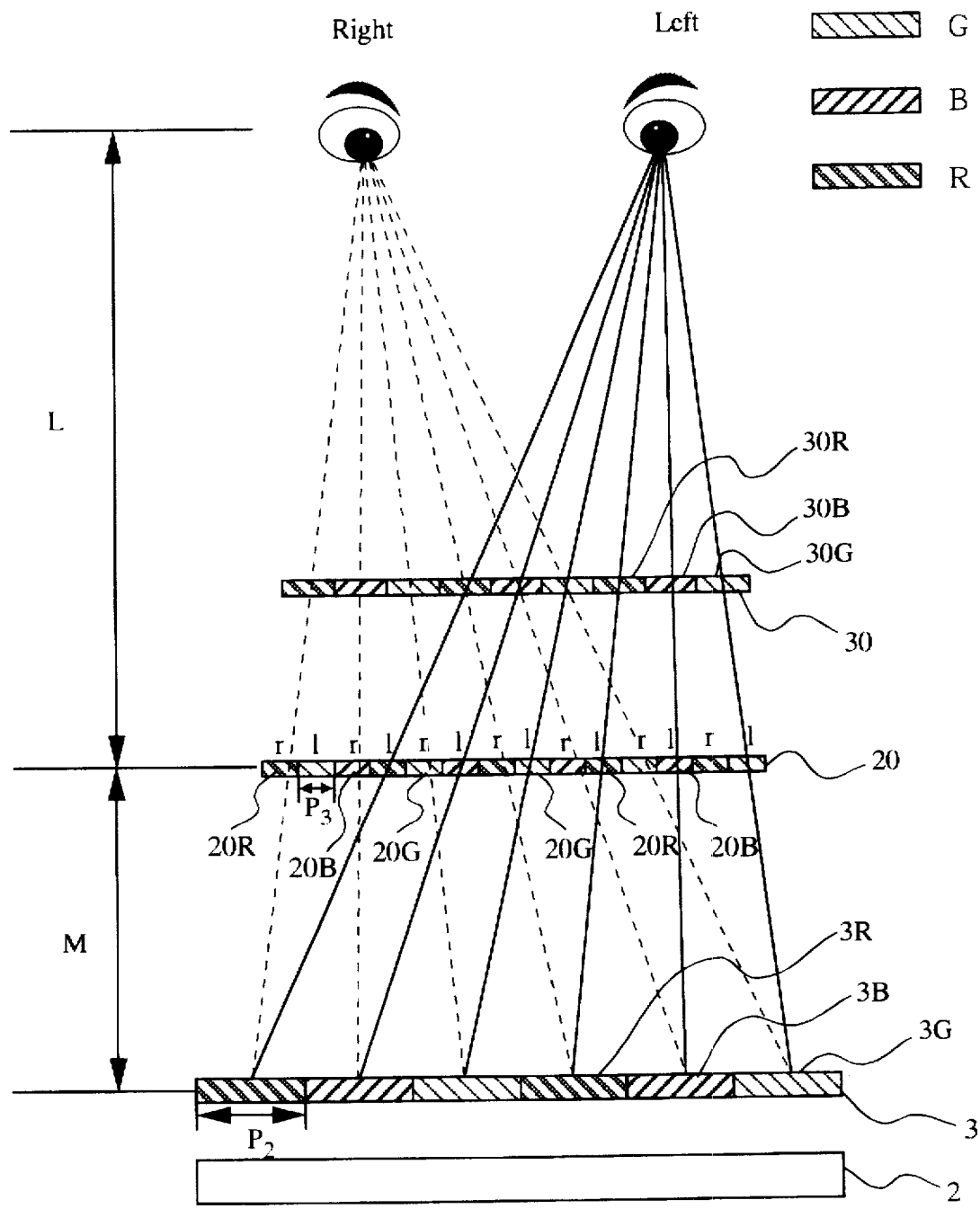
FIG. 10 is a schematic view showing the construction of 3-D display according to the fifth embodiment of the present invention.

In the fifth embodiment according to the present invention shown in FIG. 10, a liquid crystal panel for black-and-white images 20 is used for displaying color 3-D images with liquid crystal, as against the liquid crystal panel for color images 1 used in the first to the fourth embodiments.

As shown in FIG. 10, the 3-D display is constructed such that an observer is on the front side of the liquid crystal panel for black-and-white images 20 and see the lights, which are emitted from the backlight 2 arranged on the back side of the liquid crystal panel for black-and-white images 20, separated in a stripe shape having the respective colors, red, green and blue, and pass through the liquid crystal panel for black-and-white images 20, through a color filter 30.

As in above described embodiments, the color filter 3 is arranged on the light emission side of the backlight 2. The color filter 3 is constructed with blue filters 3B, green filters 3G and red filters 3R. Each of color filters 3B, 3G and 3R is formed by spreading a dye stuff or a pigment in a stripe shape which is extended in a vertical direction. If the color filter 3 is observed from the backlight side, 3R, 3B and 3G are aligned in this order from the left to the right, in a horizontal direction.

In the liquid crystal panel for black-and-white images 20 arranged on the light emission side of the color filter 3, columns of left eye pixels in which pixels l to be controlled by the left eye image signal are aligned in a vertical direction and columns of right eye pixels in which pixels r to be controlled by the right eye image signal are aligned in a vertical direction are formed one line after the other in a horizontal direction.

Additionally, pixels l and r are respectively constructed with three kinds of pixels, first pixels 20R controlled by the image signal having the red color difference signal, second pixels 20G controlled by the image signal having the green color difference signal, and third pixels 20B controlled by the image signal having the blue color difference signal. If the pixels are observed from the backlight side, 20R, 20G and 20B are formed being aligned in this order from the left to the right, in a horizontal direction. Therefore, if arrangements of colors of the image signals which control respective pixels are compared to that of above color filter 3, they are the opposite to each other in rightward and leftward directions.

In FIG. 10, the first left eye pixels 20R (l) controlled by the red image signal for left eye is equal to left eye pixels l and the first pixels 20R. For simplification, only portions having pixels for display are illustrated and illustration of such as thin film transistor (TFT) substrate, a pair of panels facing to each other, and the black matrix are omitted.

Furthermore, each of the filters 3R, 3G and 3B in the color filter 3 has the same width in a horizontal direction to each other. Each of the pixels 20R, 20G and 20B in the liquid crystal panel 20 also has the same width in a horizontal direction to each other. Since there is no need to provide any light screening portion such as the black matrix between the filters 3R, 3G and 3B, pitches between the filters 3R, 3G and 3B are set up to be a little larger than twice as the pitches between the pixels 20R, 20G and 20B. To put it concretely, the relationship can be shown in following expression (3), letting $P_2$ be filter pitches in the color filter 3, $P_3$ be pixel pitches in the liquid crystal panel 20, L be the most proper distance between the liquid crystal panel and an observer, and M be a distance between the color filter 3 and the liquid crystal panel 20.

$$P_2 32 [2P_3(L+M)]/L \qquad (3)$$

Each of the color filters 3R, 3G and 3B is arranged for pixels 20R, 20G and 20B of a corresponding number to that of the observing points. Therefore, in this embodiment in which two observing points exist, each of color filers 3R, 3G and 3B is arranged to be corresponded to two pixels.

Additionally, in this embodiment, a color filter 30 is arranged on light emission side of the liquid crystal panel 20. The color filter 30 is formed by spreading a dye stuff or a pigment in a stripe shape such that filters of the three primary colors, blue filters 30B, red filters 30R and green filters 30G are aligned in the opposite order to that of the blue pixels 20B, red pixels 20R and green pixels 20G in the liquid crystal panel 20.

The color filters 30R, 30G and 30B are each formed for respective pixels 20R, 20B and 20G of a corresponding number to that of the observing points. Therefore, in this embodiment in which two observing points exist, each of the color filters 30R, 30G and 30B is arranged to be corresponded to respective two pixels. Each of the color filters 30R, 30G and 30B is formed to have a width, in a lateral direction, which is a little smaller than twice as that of respective pixels 20R, 20G and 20B.

Out of all lights emitted from the backlight 2, only lights having the same color with that of respective color filters 3R, 3G and 3B can pass through the color filter, and lights having different colors are absorbed. Accordingly, the lights from the backlight 2 are emitted from the color filter 3 as very small luminescences in a stripe shape in which respective colors, blue, red and green are aligned in the opposite order to that of the pixels 20R, 20G and 20B in the liquid crystal panel 20.

The lights which passed through the respective pixels 20R, 20G and 20B in the liquid crystal panel 20 are given to respective filters in the color filter 30. For example, filters for red color 30R let lights having the same color from the color filter 3, that is red lights emitted from the pixels 20R in the liquid crystal panel 20, pass through, however, absorb blue and green lights. Therefore, when it was observed from an observing position, very small luminescences of blue and green are screened by the color filter 30 and traveling direction of very small luminescences from the color filter 3 are restricted depending on each color.

Accordingly, 3-D images having red color can be observed by forming left eye images and right eye images one line after the other line for red pixels 20R in every line in the liquid crystal panel 20.

Since 3-D images of other colors, blue and green, can be observed in the same method, an observer can see 3-D color images being composition of the three primary colors, blue, red and green.

As described above, 3-D color images can be displayed with a liquid crystal panel for black-and-white images which costs lower, and has less process and better yield than a liquid crystal panel for color images.

Although the color filter 3 is arranged between the backlight 2 and the liquid crystal panel for black-and-white images 20 in this embodiment, it is also possible to construct such as to form the color filter 3 on a surface of the backlight 2.

As methods for realizing a set of very small luminescences of red, green and blue, except using color filters formed with a dye stuff or a pigment as in above embodiment, it is also possible to form with a dichronic filter as shown in another above embodiment. If a backlight having a fluorescent surface formed on a flat surface such as a cold cathode type flat fluorescent lamp and cathode luminescence flat light source is used, it is also possible to realize the fluorescent surface by independently forming red, green and blue fluorescent bodies. The three examples of the latter half are advantageous for improving efficiency of light utilization, too.

Figure 11:
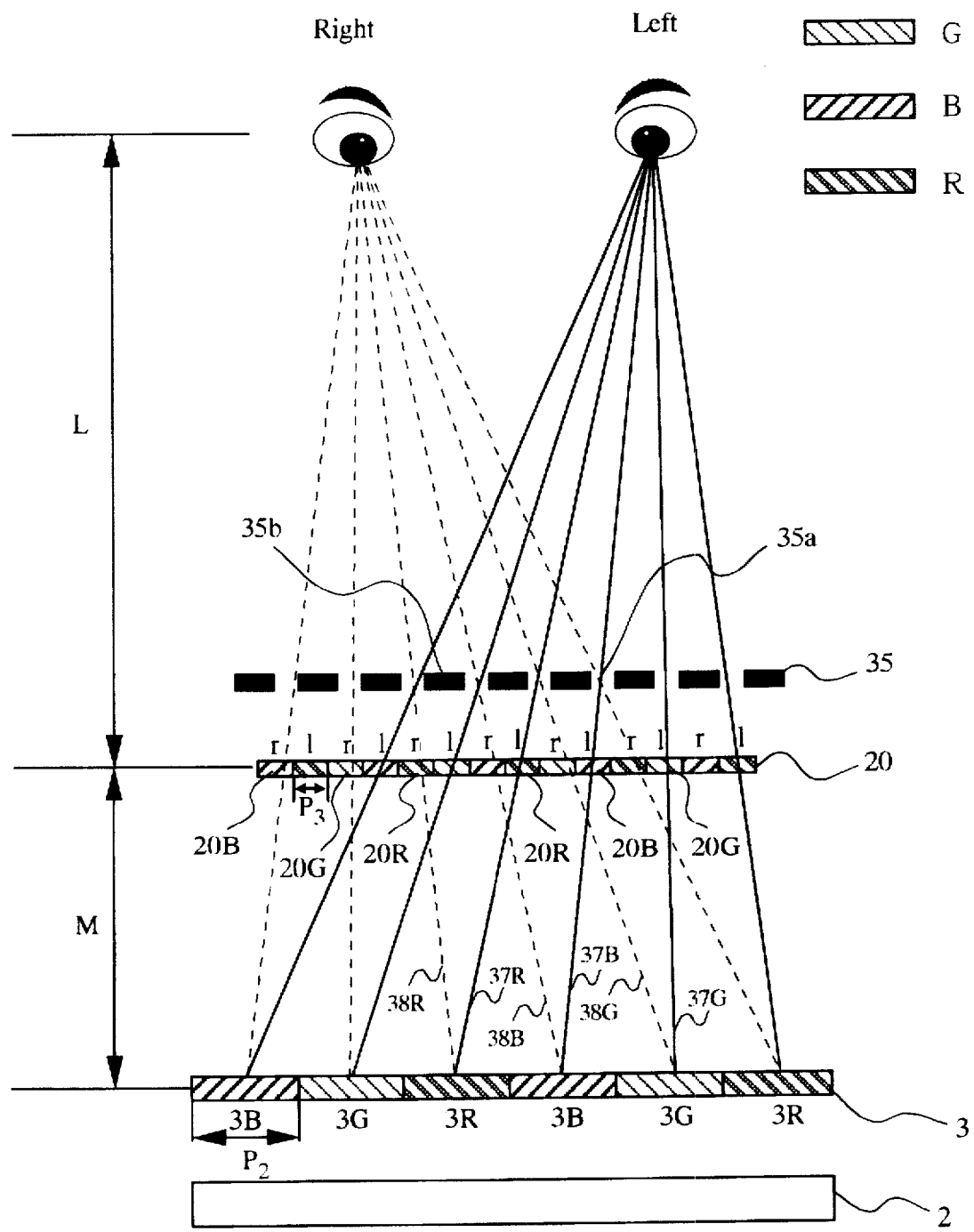
FIG. 11 is a schematic view showing the construction of 3-D display according to the sixth embodiment of the present invention.

In the sixth embodiment according to the present invention, color 3-D images are displayed with liquid crystal, using the liquid crystal panel for black-and-white images 20, as in the fifth embodiment. According to the sixth embodiment, a parallax barrier panel 35 is arranged on the light emission side of the liquid crystal panel 20, as shown in FIG. 11. Since other constructions are the same with those in the fifth embodiment, detailed description is omitted to avoid overlapping.

As shown in FIG. 11, the parallax barrier panel 35 is a slit panel in which long aperture portions 35a being extended in a vertical direction and long light screening portions 35b being extended in a vertical direction are formed one after the other in a horizontal direction. Moreover, the parallax barrier panel 35 is so formed in a horizontal direction that one aperture portion 35a is corresponded to two pixels in the liquid crystal panel 20.

The positional relationship among the color filter 3, the liquid crystal panel 20 and the parallax barrier panel 35 is as follows, when a observer is in the proper observing position where fine images can be observed. Left eye of the observer (Left), an aperture portion 35a of the parallax barrier panel 35, a first left eye pixel 20R (l) of the liquid crystal panel 20 and a red filter 3R of the color filter 3, the left eye (Left), an aperture portion 35a of the parallax barrier panel 35, a second left eye pixel 20G (l) of the liquid crystal panel 20 and a green filter 3G of the color filter 3, and the left eye (Left), an aperture portion 35a of the parallax barrier panel 35, a third left eye pixel 20B (l) in the liquid crystal panel 20 and a blue filter 3B of the color filter 3 are respectively aligned in each straight line. Moreover, right eye of the observer (Right), an aperture portion 35a of the parallax barrier panel 35, a first right eye pixel 20R (r) of the liquid crystal panel 20 and a red filter 3R of the color filter 3, the right eye (Right), an aperture portion 35a of the parallax barrier panel 35, a second right eye pixel 20G (r) of the liquid crystal panel 20 and a green filter 3G of the color filter 3, and the right eye (Right), an aperture portion 35a of the parallax barrier panel 35, a third right eye pixel 20B (r) in the liquid crystal panel 20 and a blue filter 3B of the color filter 3 are respectively aligned in each straight line.

Furthermore, left eye (Left) of the observer in a proper observing position, a light screening portion 35b of the parallax barrier panel 35, each of right eye pixels 20R (r), 20G (r) and 20B (r) in the liquid crystal panel 20, and right eye (Right) of the observer, a light screening portion 35b of the parallax barrier panel 35, each of left eye pixels 20R (l), 20G (l) and 20B (l) in the liquid crystal panel 20 are respectively aligned in each straight line.

As described above, in the 3-D display, lights emitted from the backlight 2 pass through the color filter 3. Then, lights passing by the red filters 3R, the green filters 3G and the blue filters 3B respectively become red lights, green lights and blue lights being extended in a longitudinal direction, whereby the lights are emitted in color separated condition.

The red lights, the green lights and the blue lights generated by the color filter 3 enter the liquid crystal panel 20. Out of the lights which enter the liquid crystal panel 20, now description is made of lights which travel toward right and left eyes of the observer in a proper observing position. A light 37R, one of the red lights which enters the liquid crystal panel 20 and pass through the first left eye pixel 20R (l), passes through an aperture portion 35a of the parallax barrier panel 35 and enters the left eye (Left) of the observer in the proper observing portion. A light 38R, another red light which enters the liquid crystal panel 20 and pass through the first right eye pixel 20R (r), passes through the aperture portion 35a of the parallax barrier panel 35 and enters the right eye (Right) of the observer. On the other hand, out of the red lights, those which pass through the second and the third left eye pixels 20G (l) and 20B (l) and the second and the third right eye pixels 20G (r) and 20B (r) are screened by light screening portions 35b of the parallax barrier 35 and do not reach observer's eyes.

Out of the green lights which enter the liquid crystal panel 20, a light 37G which passes through the second left eye-pixel 20G (l) further passes through an aperture portion 35a of the parallax barrier panel 35 and enters the left eye (Left) of the observer. And a light 38G which passes through the second right eye pixel 20G (r) further passes through an aperture portion 35a of the parallax barrier 35 and enters the right eye (Right) of the observer. On the other hand, out of the green lights, those which pass through the first and the third left eye pixels 20R (l) and 20B (l), and the first and the third right eye pixels 20R (r) and 20B (r) are screened by light screening portions 35b of the parallax barrier 35 and do not enter right and left eyes of the observer.

Furthermore, out of the blue lights which enter the liquid crystal panel 20, a light 37B which passes through the third left eye pixel 20B (l) further passes through an aperture portion 35a of the parallax barrier panel 35 and enters the left eye (Left) of the observer. And a light 38B which passes through the third right eye pixel 20B (r) further passes through an aperture portion 35a of the parallax barrier 35 and enters the right eye (Right) of the observer. On the other hand, out of the blue lights, those which pass through the first and the second left eye pixels 20R (l) and 20G (l), and the first and the second right eye pixels 20R (r) and 20G (r) are screened by light screening portions 35b of the parallax barrier 35 and do not enter right and left eyes of the observer.

Therefore, red, green and blue lights which pass through the left eye pixels l enter the left eye (Left) of the observer. Accordingly, the red lights which enter the left eye (Left) are modulated lights in the first left eye pixel 20R (l) by red image signal for the left eye, the green lights which enter the left eye (Left) are modulated lights in the second left eye pixel 20G (l) by green image signal for the left eye, and the blue lights which enter the left eye (Left) are modulated lights in the third left eye pixel 20B (l) by blue image signal, whereby the observer recognizes left eye color images displayed on the liquid crystal panel 20 with the left eye (Left).

Likewise, red, green and blue lights which pass through the right eye pixels r enter the right eye (Right) of the observer. Accordingly, the red lights which enter the right eye (Right) are modulated lights in the first right eye pixel 20R (r) by red image signal for the right eye, the green lights which enter the right eye (Right) are modulated lights in the second right eye pixel 20G (r) by green image signal for the right eye, and the blue lights which enter the right eye (Right) are modulated lights in the third right eye pixel 20B (r) by blue image signal, whereby the observer recognizes right eye color images displayed on the liquid crystal panel 20 with the right eye (Right).

Therefore, the observer recognizes left eye color images with the left eye (Left), right eye color images with the right eye (Right), and 3-D color images by the binocular parallax.

As described above, in the 3-D display according to the sixth embodiment, 3-D color images can be displayed with a liquid crystal panel for black-and-white images which is low costed.

Moreover, in the 3-D display according to the sixth embodiment, if the observing position moves, color of lights which enter observer's eyes are changed, even though the lights pass the same pixel in the liquid crystal panel 20.

Figure 12:
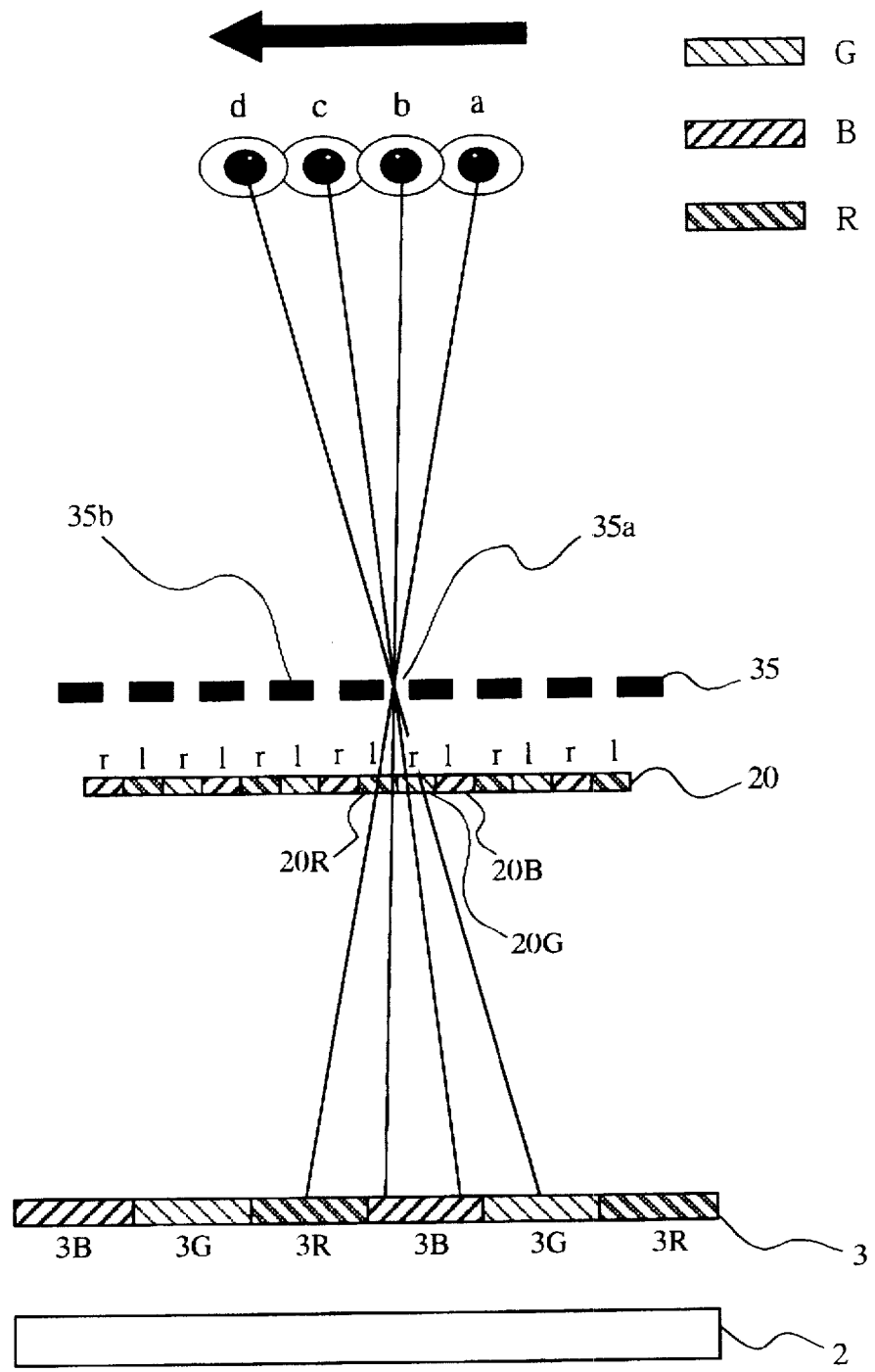
FIG. 12 is a schematic view showing a condition of the three dimensional display according to the sixth embodiment of the present invention when observer moves from a proper observing position.

To put it concretely, when the left eye (Left) is in a proper observing position a where fine 3-D images can be observed, as shown in FIG. 12, a red light modulated in the first left eye pixel 20R (l) with red image signal enters the left eye (Left), however, when the left eye (Left) moves to position b, a blue light modulated in the first left eye pixel 20R (l) with red image signal for the left eye enters the left eye (Left). When the left eye (Left) further moves to position c, a blue light modulated in the second right eye pixel 20G (r) with green image signal for the right eye enter the left eye, that is, an inverse observing condition occurs in which lights for right eyes enter the left eye (Left). When the left eye (Left) further moves to position d, a green light modulated in the second right eye pixel 20G (r) with green image signal for the right eye, that is, a complete inverse observing condition occurs.

When the left eye (Left) is nearly out of the proper observing position, color of the light the observer recognizes changes from red to blue even passing through the same pixel and an inverse observing condition occurs, whereby the observer can know that he/she is nearly out of the proper observing position and avoid the movement to the inverse observing position, according to the change of color.

Now description is made of the seventh embodiment according to the present invention.

Figure 13:
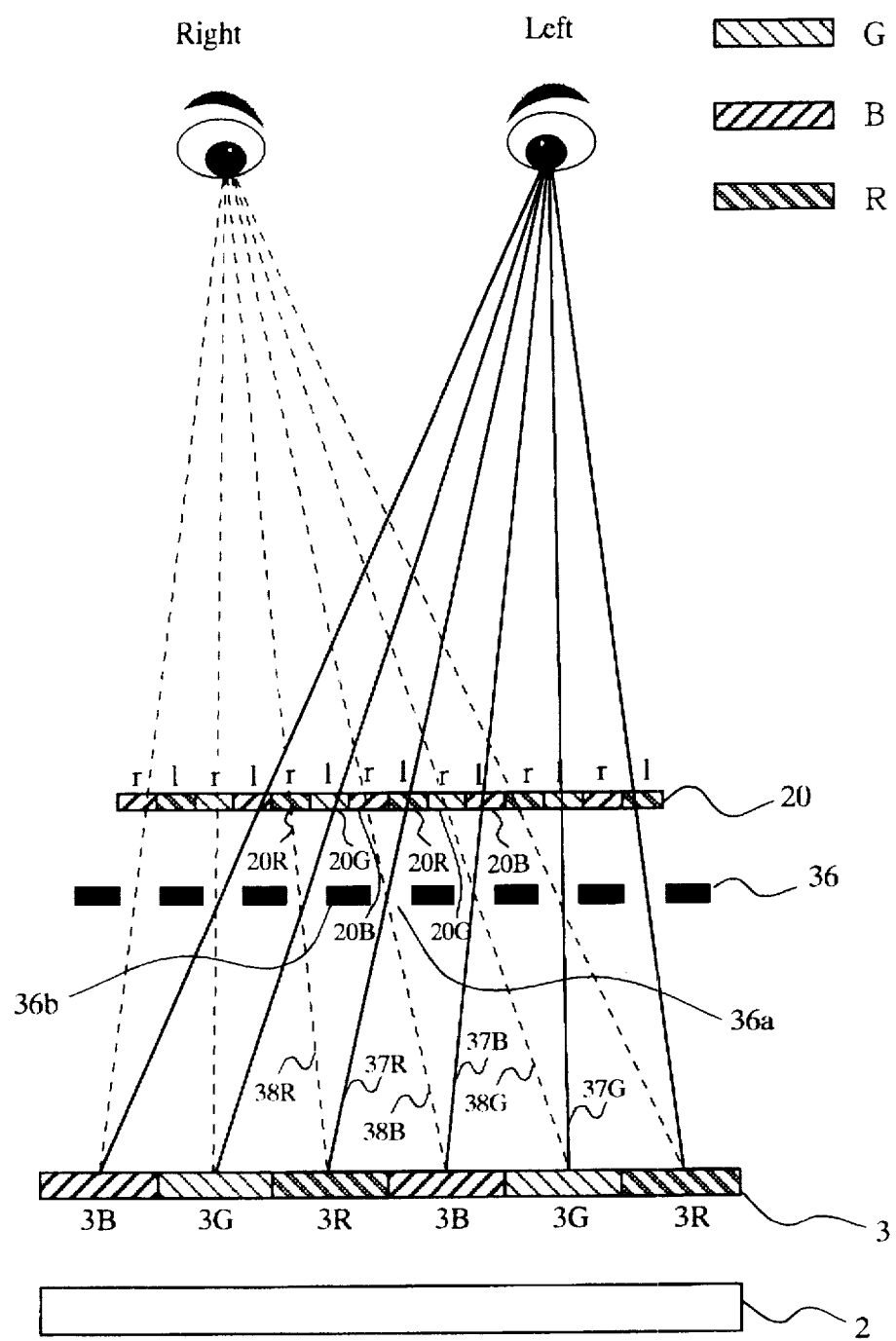
FIG. 13 is a schematic view showing the principle of a 3-D display according to the seventh embodiment of the present invention.

FIG. 13 is a schematic view showing principles of a 3-D display according to the seventh embodiment. The same portions with that in the fifth and the sixth embodiments are indicated with the same symbols, and no description is made on those portions.

In the seventh embodiment, a barrier panel on the light incidence side 36 is arranged on the light incidence side of the liquid crystal panel 20. The barrier panel on the light incidence side 36 is a slit panel in which long aperture portions 36a and long light screening portions 36b being extended in a vertical direction are formed one after the other in a horizontal direction.

The positional relationship between the color filter 3, the liquid crystal panel 20 and the barrier panel on the light incidence side 36 is as follows, when a observer is in the proper observing position. The left eye (Left) of the observer, the first left eye pixel 20R (l) in the liquid crystal panel 20, an aperture portion 36a of the barrier panel on the light incidence side 36 and a red filter 3R of the color filter 3, the left eye (Left), the second left eye pixel 20G (l) in the liquid crystal panel 20, an aperture portion 36a of the barrier panel on the light incidence side 36 and a green filter 3G of the color filter 3, and the left eye (Left), the third left eye pixel 20B (l) in the liquid crystal panel 20, an aperture portion 36a of the barrier panel on the light incidence side 36 and a blue filter 3B of the color filter 3 are respectively arranged to be aligned in each straight line. Moreover, right eye of the observer (Right), the first right eye pixel 20R (r) in the liquid crystal panel 20, an aperture portion 36a of the barrier panel on the light incidence side 36 and a red filter 3R in the color filter 3, the right eye (Right), the second right eye pixel 20G (r) in the liquid crystal panel 20, an aperture portion 36a of the barrier panel on the light incidence side 36 and a green filter 3G of the color filter 3, and the right eye (Right), the third right eye pixel 20B (r) in the liquid crystal panel 20, an aperture portion 36a of the barrier panel on the light incidence side 36 and a blue filter 3B of the color filter 3 are respectively arranged to be aligned in each straight line.

Furthermore, the left eye (Left) of the observer in a proper observing position, each of right eye pixels 20R (r), 20G (r) and 20B (r), and a light screening portion 36b of the barrier panel on the light incidence side 36 are aligned in a straight line. And the right eye (Right), each of left eye pixels 20R (l), 20G (l) and 20B (l), and a light screening portion 36b of the barrier panel on the light incidence side 36 are also arranged to be aligned in a straight line.

In the 3-D display, now description is made of lights which travel toward right and left eyes of the observer in a proper observing position, out of the lights which enter the color filter 3. A light 37R, one of the red lights which pass through the color filter 3, which passes through an aperture portion 36a of the barrier panel on the light incidence side 36 and modulated in the first left eye pixel 20R (l) in the liquid crystal panel 20 by red image signal for left eye, enters the left eye (Left) of the observer in the proper observing portion. A light 38R, another red light which passes through an aperture portion 36a of the barrier panel on the light incidence side 36 and modulated in the first right eye pixel 20R (r) in the liquid crystal panel 20 by red image signal for right eye, enters the right eye (Right) of the observer.

Out of the green lights which pass by the color filter 3, a light 37G which passes through an aperture portion 36a of the barrier panel on the light incidence side 36 and be modulated in the second left eye pixel 20G (l) in the liquid crystal panel 20 by green image signal for left eye, enters the left eye (Left) of the observer. And a light 38G which passes through an aperture portion 36a of the barrier panel on light incidence side 36 and be modulated in the second right eye pixel 20G (r) in the liquid crystal panel 20 by green image signal for right eye, enters the right eye (Right) of the observer.

Out of the blue lights which pass through the color filter 3, a light 37B which passes through an aperture portion 36a of the barrier panel on the light incidence side 36 and be modulated in the third left eye pixel 20B (l) in the liquid crystal panel 20 by blue image signal for left eye, enters the left eye (Left) of the observer. And a light 38B which passes through an aperture portion 36a of the barrier panel on the light incidence side 36 and be modulated in the second right eye pixel 20B (r) in the liquid crystal panel 20 by blue image signal for right eye, enters the right eye (Right) of the observer.

On the other hand, out of the lights which pass through the color filter 3, the lights which are modulated in right eye pixels r and travel towards the left eye of the observer do not enter the liquid crystal panel 20, being screened by a light screening portion 36b of the barrier panel on the light incidence side 36. Moreover, out of the lights which pass through the color filter 3, the lights which are modulated in left eye pixels l and travel towards the right eye of the observer do not enter the liquid crystal panel 20, being screened by a light screening portion 36b of the barrier panel on the light incidence side 36. Therefore, lights for right eye images and lights for left eye images do not enter respectively the left eye (Left) and the right eye (Right) of the observer in the proper observing position.

The observer in the proper observing portion recognizes left eye color images with lights of respective colors modulated in the first, second and third left eye pixels 20R (l), 20G (l) and 20B (l) with the left eye (Left), right eye color images with lights of respective colors modulated in the first, the second and the third right eye pixels 20R (r), 20G (r) and 20B (r) with the right eye (Right), and 3-D color images by the binocular parallax.

In the 3-D display according to the seventh embodiment, 3-D color images can be displayed with a liquid crystal panel for black-and-white images which is low costed, as in the fifth embodiment.

Additionally, when the observer moves from the proper observing position to the inverse observing position, colors of lights which pass through certain pixel in the liquid crystal panel 20 change as in the sixth embodiment, so that the observer can detect the change of color and avoid movements to the inverse observing position.

Furthermore, in the seventh embodiment, the barrier panel on the light incidence side 36 is hidden by the liquid crystal panel 20 for the observer, whereby the barrier panel on the light incidence side 36 does not obstruct the view of the observer. If a surface on the backlight 2 side of the barrier panel on the light incidence side 36 is formed with a reflecting material such as aluminum, the lights screened at a light screening portion 36b is reflected over and over between the backlight 2 and the light screening portion 36b and eventually emitted from an aperture portion 36a toward the liquid crystal panel 20, so that effective utilization of lights and higher brightness of 3-D images can be obtained.

Now description is made of the eighth embodiment according to the present invention.

Figure 14:
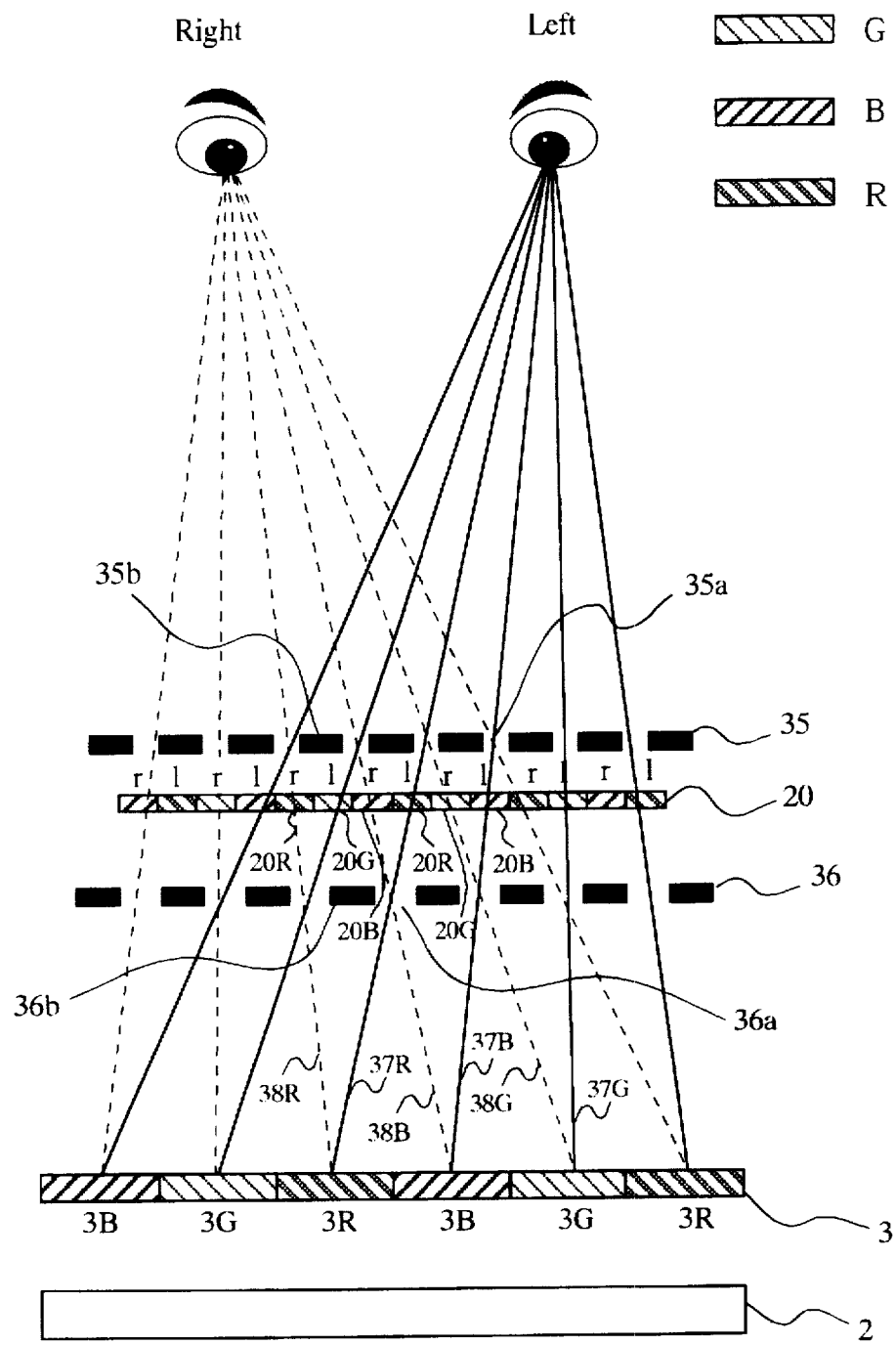
FIG. 14 is a schematic view showing the construction of 3-D display according to the eighth embodiment of the present invention.

FIG. 14 is a schematic view showing the construction of 3-D display according to the eighth embodiment of the present invention. The same portion with that in the fifth, the sixth and the seventh embodiments are indicated with the same symbols, and description of those portions is omitted.

In the 3-D display of the eighth embodiment, when the observer is in the proper observing position, the left eye (Left) of the observer, an aperture portion 35a of the parallax barrier panel 35, the first left eye pixel 20R (l) in the liquid crystal panel 20, an aperture portion 36a of the barrier panel on the light incidence side 36 and a red filter 3R of the color filter 3, the left eye (Left), an aperture portion 35a of the parallax barrier panel 35, the second left eye pixel 20G (l) in the liquid crystal panel 20, an aperture portion 36a of the barrier panel on the light incidence side 36 and a green filter 3G of the color filter 3, and the left eye (Left), an aperture portion 35a of the parallax barrier panel 35, the third left eye pixel 20B (l) in the liquid crystal panel 20, an aperture portion 36a of the barrier panel on the light incidence side 36 and a blue filter 3B of the color filter 3 are respectively arranged to be aligned in each straight line. Moreover, right eye of the observer (Right), an aperture portion 35a of the parallax barrier 35, the first right eye pixel 20R (r) in the liquid crystal panel 20, an aperture portion 36a of the barrier panel on the light incidence side 36 and a red filter 3R in the color filter 3, the right eye (Right), an aperture portion 35a of the parallax barrier panel 35, the second right eye pixel 20G (r) in the liquid crystal panel 20, an aperture portion 36a of the barrier panel on the light incidence side 36 and a green filter 3G of the color filter 3, and the right eye (Right), an aperture portion 35a of the parallax barrier panel 35, the third right eye pixel 20B (r) in the liquid crystal panel 20, an aperture portion 36a of the barrier panel on the light incidence side 36 and a blue filter 3B of the color filter 3 are respectively arranged to be aligned in each straight line. Likewise, the left eye (Left) of the observer in the proper observing position, a light screening portion 35b of the parallax barrier panel 35, each of right eye pixels 20R (r), 20G (r) and 20B (r) in the liquid crystal panel 20 and a light screening portion 36b of the barrier panel on the light incidence side 36, and the right eye (Right), a light screening portion 35b of the parallax barrier panel 35, each of left eye pixels 20R (l), 20G (l), and 20B (l) in the liquid crystal panel 20 and a light screening portion 36b of the barrier panel on the light incidence side 36 are respectively aligned in each straight line.

Now description is made of lights which travel toward right and left eyes of the observer in a proper observing position, out of the lights which enter the color filter 3, in the 3-D display. A light 37R, one of the red lights which pass through the color filter 3, which passes through an aperture portion 36a of the barrier panel on the light incidence side 36 and modulated in the first left eye pixel 20R (l) in the liquid crystal panel 20 by red image signal for left eye, enters the left eye (Left) of the observer in the proper observing portion through an aperture portion 35a of the parallax barrier panel 35. A light 38R, another red light which passes through an aperture portion 36a of the barrier panel on the light incidence side 36 and modulated in the first right eye pixel 20R (r) in the liquid crystal panel 20 by red image signal for right eye, enters the right eye (Right) of the observer in the proper observing portion through an aperture portion 35a of the parallax barrier panel 35.

Out of the green lights which pass by the color filter 3, a light 37G which passes through an aperture portion 36a of the barrier panel on the light incidence side 36 and be modulated in the second left eye pixel 20G (l) in the liquid crystal panel 20 by green image signal for left eye, enters the left eye (Left) of the observer through an aperture portion 35a of the parallax barrier panel 35. And a light 38G which passes through an aperture portion 36a of the barrier panel on the light incidence side 36 and be modulated in the second right eye pixel 20G (r) in the liquid crystal panel 20 by green image signal for right eye, enters the right eye (Right) of the observer through an aperture portion 35a of the parallax barrier panel 35.

Out of the blue lights which pass through the color filter 3, a light 37B which passes through an aperture portion 36a of the barrier panel on the light incidence side 36 and be modulated in the third left eye pixel 20B (l) in the liquid crystal panel 20 by blue image signal for left eye, enters the left eye (Left) of the observer through an aperture portion 35a of the parallax barrier panel 35. And a light 38B which passes through an aperture portion 36a of the barrier panel on the light incidence side 36 and be modulated in the second right eye pixel 20B (r) in the liquid crystal panel 20 by blue image signal for right eye, enters the right eye (Right) of the observer through an aperture portion 35a of the parallax barrier panel 35.

On the other hand, the lights which pass through each of the right eye pixels 20R (r), 20G (r) and 20B (r) and travel toward the left eye (left) of the observer do not enter the left eye, being screened by a light screening portion 36b of the barrier panel on the light incidence side 36 and a light screening portion 35a of the parallax barrier panel 35. Moreover, the lights which pass through each of the left eye pixels 20R (l), 20G (l) and 20B (l) and travel toward the right eye (Right) of the observer do not enter the right eye, being screened by a light screening portion 36b of the barrier panel on the light incidence side 36 and a light screening portion 35a of the parallax barrier panel 35.

Therefore, the observer in the proper observing position recognizes left eye color images with the left eye (Left), right eye color images with the right eye (Right), and 3-D color images by the binocular parallax as in the fifth, the sixth and the seventh embodiments.

In the 3-D display according to the eighth embodiment, 3-D color images can be displayed with a liquid crystal panel for black-and-white images which is low costed, as in the fifth, the sixth and the seventh embodiment.

Additionally, when the observer moves from the proper observing position to the inverse observing position, colors of lights which pass through certain pixel in the liquid crystal panel 20 and enter the observer's eyes change as in the sixth and the seventh embodiments, so that the observer can detect the change of color and avoid movements to the inverse observing position.

Furthermore, if a surface on the backlight 2 side of the barrier panel on the light incidence side 36 is formed with a reflecting material such as aluminum, the lights screened at a light screening portion 36b is reflected over and over between the backlight 2 and the light screening portion 36b and eventually emitted from an aperture portion 36a toward the liquid crystal panel 20, so that effective utilization of lights and higher brightness of 3-D images can be obtained, also in the eighth embodiment.

Figure 15:
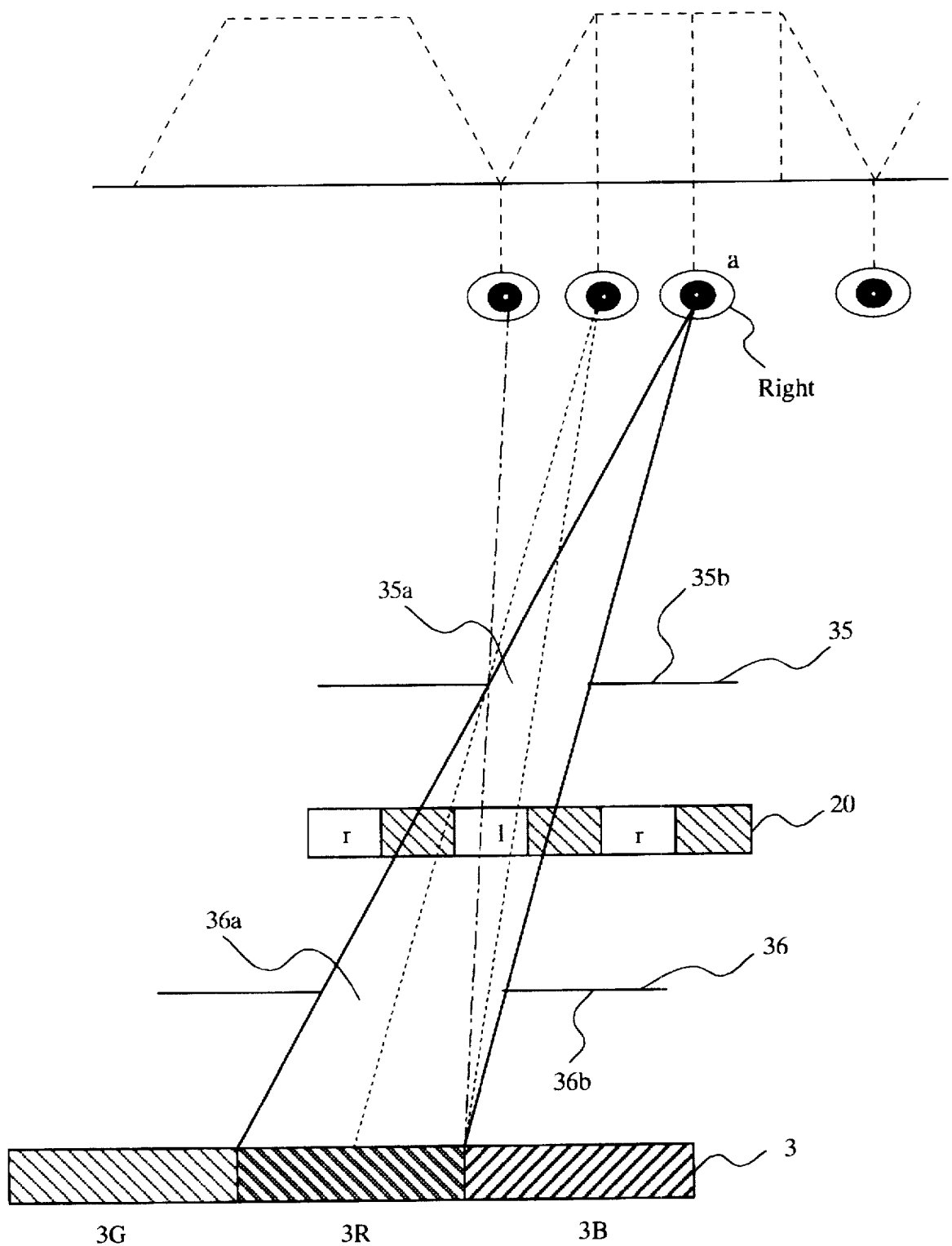
FIG. 15 is a schematic view showing the characteristics of 3-D display according to the eighth embodiment.

In the 3-D display according to the eighth embodiment, as shown in FIG. 15, the relationship between position of observer's eyes and brightness of images which the observer recognize is as follows, if the observer moves in a lateral direction from the proper observing position a. For example, in a range where left eye images can be observed as indicated with dashed line, the region of the maximum brightness exists in rightward and leftward direction from the proper observing position, and the brightness linearly decreases on the both sides thereof.

As a result, when the observer largely moves in rightward and leftward direction, there is a region where right eye images having similar distribution of the brightness can be observed and the maximum brightness can be obtained without occurring crosstalk, next to the region where left eye images can be observed. Moreover, the region where the maximum brightness can be obtained is larger than that of the sixth and the seventh embodiments.

Although the color separation means is constructed with the color filter 3 comprising a dye stuff or a pigment in the fifth to the eighth embodiments, a color filter comprising a dichronic filter can be used to constructed the color separation means instead of the color filter 3. If the color filter comprising multi-layer interference filters is used, unnecessary lights are reflected toward the backlight 2 and reused after diffused reflection at the backlight 2, whereby efficiency of light utilization can be improved.

If a backlight having fluorescent surface, which is formed in a flat plate shape such as a cold cathode type flat fluorescent lamp and a cathode luminescence flat light source, is used as the backlight 2, a color separation means can be constructed by independently forming red, green and blue fluorescent bodies with the fluorescent surface. Also in this case, the efficiency of light utilization can be improved.

In the fifth to the eighth embodiments, such a construction is possible that a polymer dispersed liquid crystal panel is arranged between the liquid crystal panel for black-and-white images 20 and the color filter 3 formed on the front surface of the backlight 2, so that 3-D images are displayed when power source is turned on, and 2-D color images are displayed on the liquid crystal panel 20 by mixing lights of respective colors separated by the color filter 3 to be white lights, using the polymer dispersed liquid crystal panel as a dispersion sheet, when the power source is turned off.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three dimensional display comprising:

a light source which emits light in a flat shape;

a liquid crystal panel for color images which displays left eye images and right eye images respectively with left eye pixels and right eye pixels; and a color separation means for converting emitted flat light received from the light source into a set of very small luminescence of red, blue and green aligned in a predetermined order which is opposite to that of the pixels of the liquid crystal panel.

2. The three dimensional display according to claim 1, in which the color separation means comprises a color filter.

3. The three dimensional display according to claim 1, in which the color separation means comprises an interference filter having selective transmittance of color.

4. The three dimensional display according to claim 1, in which the color separation means comprises very small fluorescent surfaces of respective colors aligned in a predetermined order in the light source.

5. The three dimensional display according to claim 1, in which a polymer dispersed liquid crystal panel is arranged between the light source and the liquid crystal panel.

6. A three dimensional display comprising:

a light source which emits light in a flat shape;

a light transmission type display panel which displays left eye images and right eye images respectively with left eye pixels and right eye pixels;

an image separation means for separating an image rightward and leftward into a left eye image and a right eye image; and a color separation means for converting flat light received from the light source into groups of very small luminescence of red, blue and green aligned in a predetermined order which is opposite to that of the pixels of the display panel and for emitting the groups to the display panel, wherein each of the very small luminescence of respective colors red, blue and green correspond to each observing point, and the lights of respective colors emitted from the color separation means are modulated with image signals of different colors for each of the pixels in the display panel when the lights pass through the display panel.

7. The three dimensional display according to claim 6, in which each pixel in the display panel is modulated according to an image signal of a color of a light which travels to a proper observing position, out of light passing through the display panel.

8. The three dimensional display according to claim 6, in which the display panel is for displaying black-and-white images.

9. The three dimensional display according to claim 6, in which the light of a plurality of different colors emitted by the color separation and emission means are light of the three primary colors, red, green and blue.

10. The three dimensional display according to claim 6, in which the color separation means comprises a color filter.

11. The three dimensional display according to claim 6, in which the color separation means comprises an interference filter having selective transmittance of color.

12. The three dimensional display according to claim 6, in which the color separation means comprises very small fluorescent surfaces of respective colors aligned in a predetermined order in the light source.

13. The three dimensional display according to claim 6, in which the image separation means comprises color filters corresponding to respective colors which is emitted from the color separation means.

14. The three dimensional display according to claim 6, in which the image separation means is constructed with a parallax barrier panel arranged on the light emission side of the display panel.

15. The three dimensional display according to claim 6, in which the image separation means is constructed with a barrier panel on the light incidence side which is arranged between the color separation and emission means and the display panel.

16. The three dimensional display according to claim 6, in which the image separation means is constructed with the parallax barrier panel which is arranged on the light emission side of the display panel and the barrier panel on the light incidence side which is arranged between the color separation and emission means and the display panel.

17. The three dimensional display according to claim 6, in which a polymer dispersed liquid crystal panel is arranged between the light source and the liquid crystal panel.

18. A three dimensional display according to claim 1, wherein each of said very small luminescences of red, blue and green corresponds to each observing point.

19. The three dimensional display according to claim 1, in which each of said very small luminescences of red, blue and green corresponds to two pixels in said liquid crystal panel for color images.

20. A three dimensional display comprising:

a light source which emits light in a flat shape;

a liquid crystal panel for color images which displays left eye images and right eye images respectively with left eye pixels and right eye pixels; and a color separation means for converting emitted flat light received from the light source into a set of very small luminescences of red, blue and green aligned in a reverse order to that of red, blue and green pixels in the liquid crystal panel for color images.

21. A three dimensional display according to claim 1, wherein said liquid crystal panel for color images includes red, green and blue pixels.

* * * * *